United States Patent [19]
Inaba et al.

[11] Patent Number: 4,462,748
[45] Date of Patent: Jul. 31, 1984

[54] INDUSTRIAL ROBOT

[75] Inventors: Hajimu Inaba, Hino; Shigemi Inagaki, Kokubunji, both of Japan

[73] Assignee: Fujitsu Fanuc Ltd., Tokyo, Japan

[21] Appl. No.: 394,873

[22] Filed: Jul. 2, 1982

[30] Foreign Application Priority Data

Jul. 4, 1981 [JP] Japan ................ 56-104776

[51] Int. Cl.$^3$ ........................................... B25J 11/00
[52] U.S. Cl. .................... 414/738; 414/736; 414/739
[58] Field of Search .............. 414/736, 7, 735, 738, 414/739; 91/520; 92/65, 151

[56] References Cited

U.S. PATENT DOCUMENTS

| 2,811,267 | 10/1957 | Bock | 414/736 X |
| 3,028,020 | 4/1962 | Peras | 414/736 X |
| 4,151,918 | 5/1979 | Nakane | 414/736 |
| 4,259,876 | 4/1981 | Belyanin et al. | 414/7 X |
| 4,288,192 | 9/1981 | Geiger et al. | 414/736 X |
| 4,312,622 | 1/1982 | Favareto | 414/7 X |

FOREIGN PATENT DOCUMENTS

| 2531991 | 2/1976 | Fed. Rep. of Germany | 414/7 |
| 598910 | 5/1978 | Switzerland | 414/736 |
| 876414 | 10/1981 | U.S.S.R. | 414/736 |

Primary Examiner—Joseph E. Valenza
Assistant Examiner—Terrance L. Siemens
Attorney, Agent, or Firm—Staas & Halsey

[57] ABSTRACT

An industrial robot having a hollow arm rotatable in a plane perpendicular to the longitudinal axis of a spindle of a machine tool, a wrist mechanism attached for rotation at one end of the arm, the wrist mechanism having a rotary shaft, and a gripper connected to the rotary shaft of the wrist mechanism for being rotated thereby. There are provided first and second air cylinders colinearly disposed within the arm, the first cylinder being fixed and the second cylinder being movable longitudinally of the arm. A piston rod interconnects the first and second air cylinders, the piston rod having a first piston at one end received in the first cylinder and a second piston at the other end received in the second cylinder. The piston rod is moved longitudinally of the arm by introducing air selectively into the first and second air cylinders. A pulley is affixed to the first cylinder, and a tension member such as a wire or belt is connected between the rotary shaft of the wrist mechanism and the pulley. The second cylinder is connected to the tension member. The tension member is pulled by driving the second cylinder, thereby rotating the rotary shaft, which is capable of being stopped at 0°, ±90°, and 180° positions by the use of a stopping mechanism.

8 Claims, 19 Drawing Figures

Fig. 5
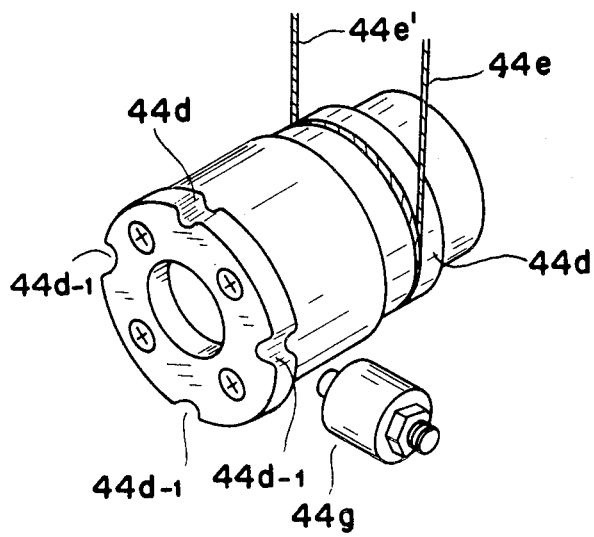
Fig. 6
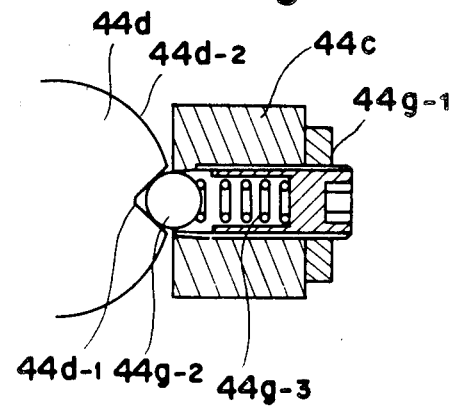
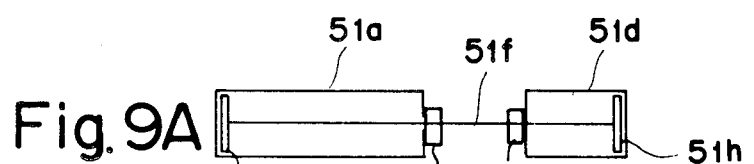
Fig. 9A
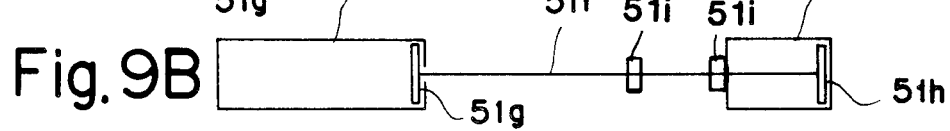
Fig. 9B
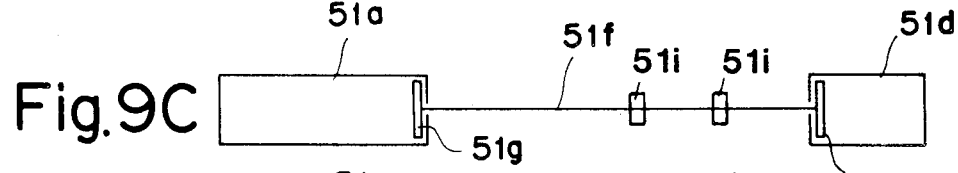
Fig. 9C
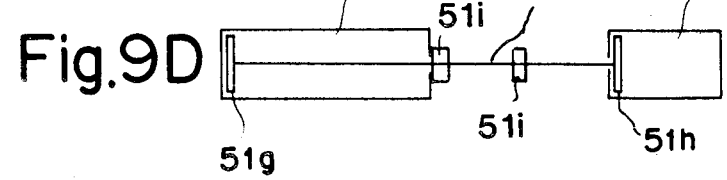
Fig. 9D

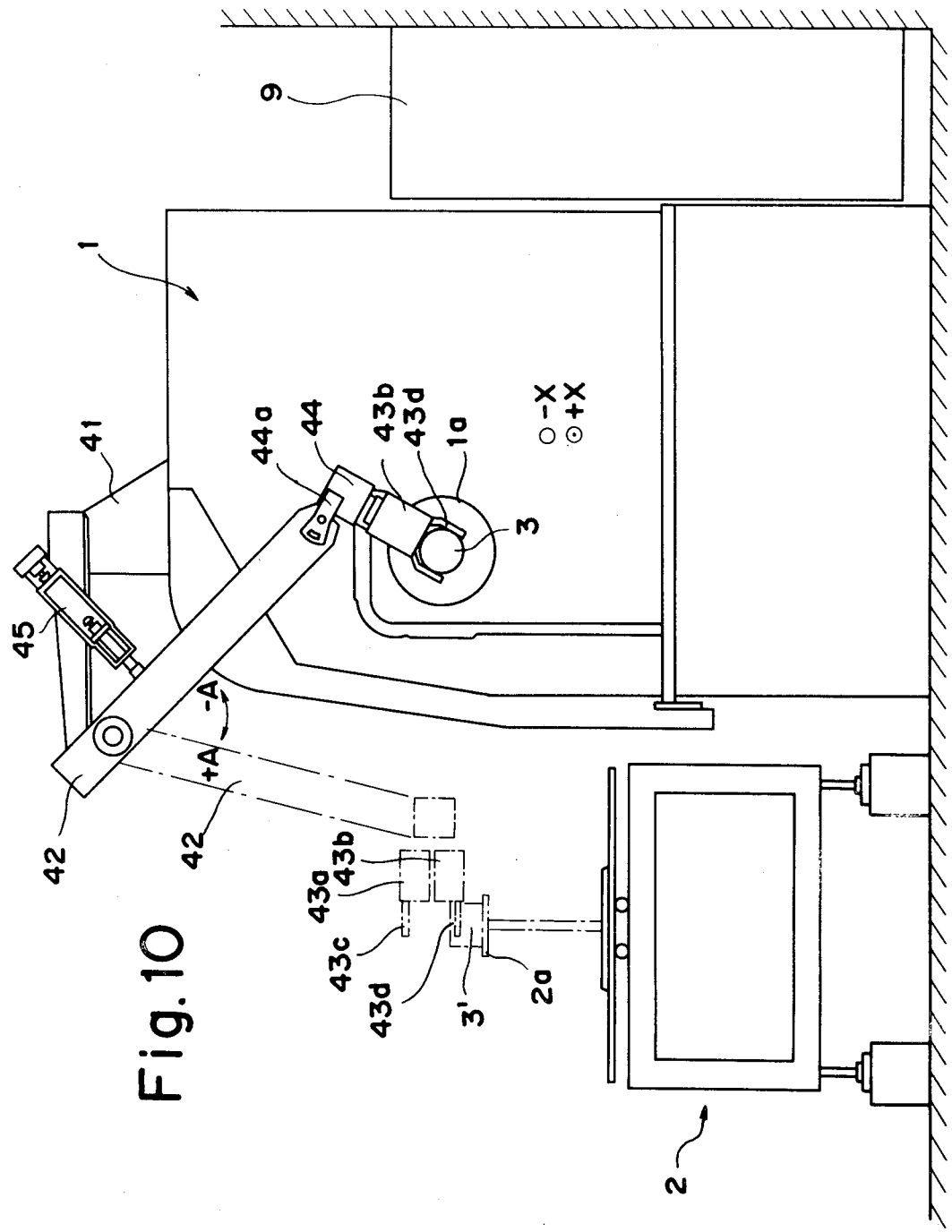

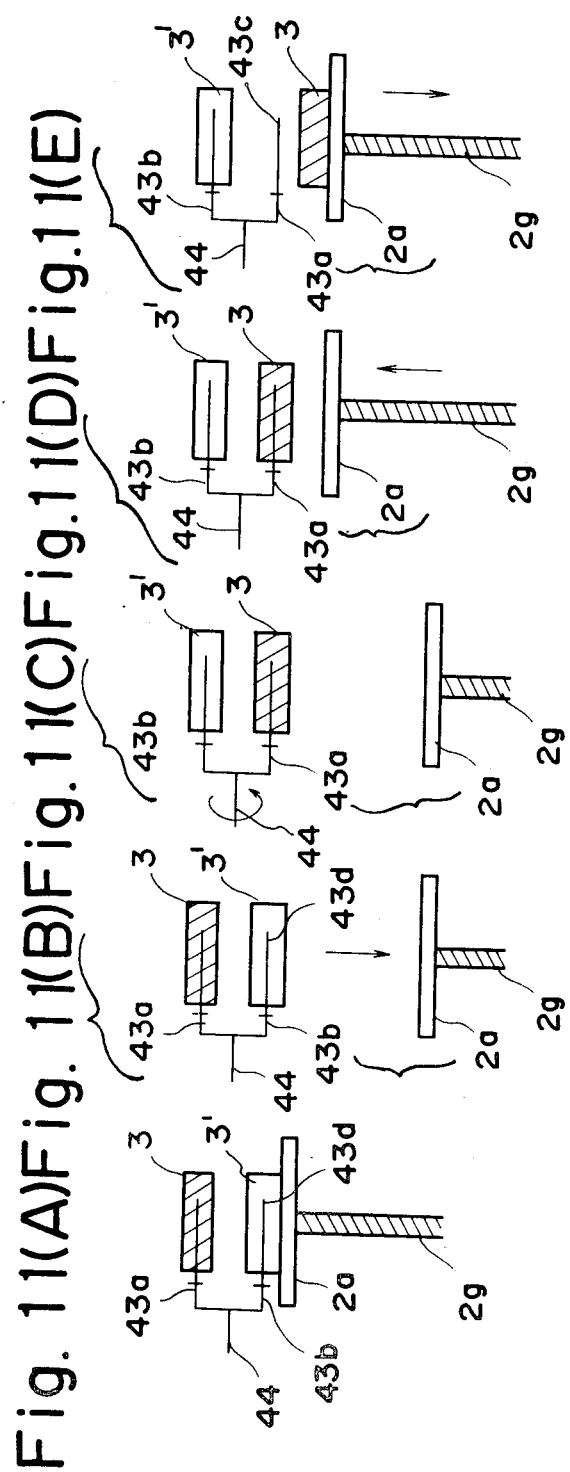

INDUSTRIAL ROBOT

BACKGROUND OF THE INVENTION

This invention relates to an industrial robot and, more particularly, to an industrial robot equipped with a special hand driving mechanism.

Industrial robots usually have a gripping device mounted at the end of a hand which extends from the robot body. The body also accommodates control and drive devices. The gripping device is adapted to grasp a workpiece placed on a pallet and to carry the workpiece over a predetermined path to another location or to the chuck of a machine tool. In response to the demand for reduction in size, compact industrial robots have recently been developed which can be installed on a machine tool per se.

In general, an industrial robot is capable of picking up an unfinished workpiece from a work feeder and loading it into the chuck of a lathe or the like, or of unloading a machined workpiece from the chuck and placing it on a table. Since the surface of the unfinished workpiece to be held by the chuck lies perpendicular to the surface of the feeder or of the table, the gripping member (hand) must be capable of being rotated through an angle of 90 degrees at the wrist connected thereto in order for the workpiece to be oriented correctly when travelling between the chuck and feeder or table.

In robots provided with a double-hand arrangement, i.e., two grippers are provided and disposed one above the other, it is required that one gripper unload a machined workpiece from the chuck and then rotate 180 degrees to permit the other gripper, which is holding an unfinished workpiece, to load that unfinished workpiece into the chuck. A further requirement is that one gripper holding a machined workpiece place the workpiece on the table and then rotate through an angle of 180 degrees to permit the other gripper to pick up an unfinished workpiece from the workpiece feeder. Thus the hand grippers must be positionable through the wrist mechanism at four points 0°, ±90°, and 180°. Heretofore, however, a small-size, structurally simple industrial robot capable of four-point positioning of the hand has not been available.

BRIEF SUMMARY OF THE INVENTION

Accordingly, an object of the present invention is to provide a small-size, structurally simple industrial robot which is capable of four-point positioning of the hand.

Another object of the present invention is to provide a small-size industrial robot capable of being installed on a machine tool.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a perspective view showing the relationship between the wrist and a click-stop mechanism of the present invention;

FIG. 6 is a sectional view of the click-stop mechanism shown in FIG. 5;

FIGS. 9A–D are illustrative views useful in describing the four-point positioning operation of the present invention; and FIGS. 10 and 11(A)–(E) are illustrative views useful in describing the mounting and demounting of a workpiece by an industrial robot according to the present invention.

DESCRIPTION OF THE PREFERRED EMBODIMENTS

Figure 1:
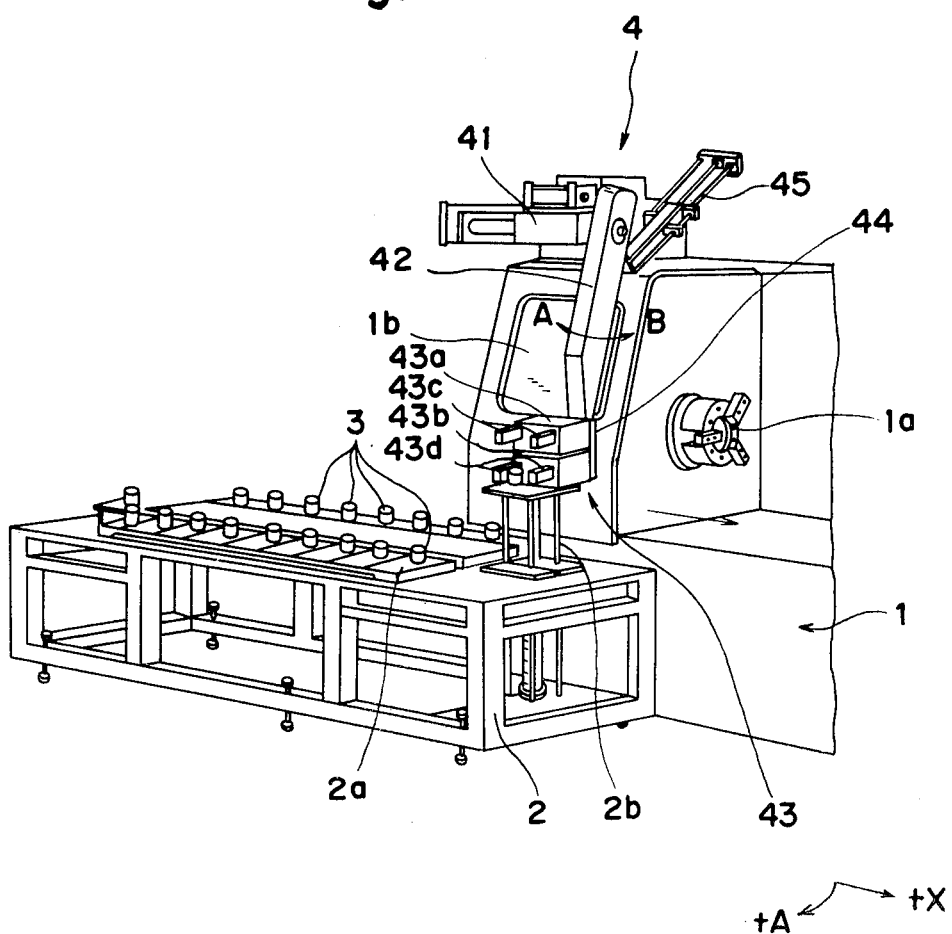
FIG. 1 is a perspective view showing an industrial robot according to the present invention installed on a machine tool.

Referring to FIG. 1, a machine tool 1 has a chuck 1a coupled to a spindle for grasping a workpiece 3 carried to the chuck 1a by an industrial robot, as will be described below, and a door 1b which is shown to be open in the drawing, but which is moved in the direction of the arrow to cover the moving parts of the machine tool when a workpiece cutting operation is in progress. Numeral 2 denotes a workpiece table constructed of a steel framework and having a plurality of movable workpiece feeder pallets 2a disposed thereon, each pallet carrying a workpiece 3. More specifically, the arrangement is such that the workpiece feeder pallets 2a, 2a .. . are moved or circulated substantially eliptically on the surface of the table 2 by a driving apparatus, not shown. When a pallet 2a is brought into position below the gripping device of the robot, the pallet is lifted by a lifting member 2b so that the workpiece may be gripped. The lifting member 2b is best shown in FIG. 2.

Figure 2:
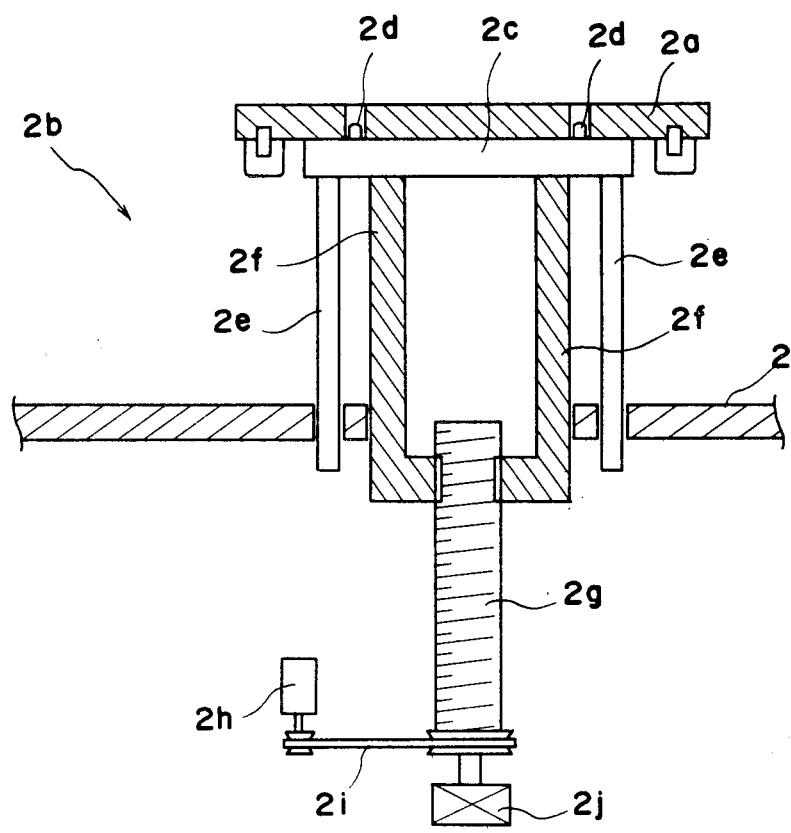
FIG. 2 is an illustrative view useful in describing the construction of the lifting member of the present invention.

In FIG. 2, the lifting member 2b includes a base 2c for pushing the pallet 2a upwardly from the table 2. The base 2c has pins 2d on its upper surface for mating with positioning holes provided in the pallet 2a, and guide rods 2e attached to the lower side thereof at each of its four corners. Each guide rod 2e passes through the upper side of the table 2. A push rod 2f has a threaded lower end which is threadedly engaged with an elevating screw 2g. The latter is coupled to a drive motor 2h via a belt 2i so that rotating the motor causes the screw 2g to turn, thereby raising and lowering the push rod 2f and, hence, the pallet 2a via the base 2c. Reference 2j denotes a brake.

Returning to FIG. 1, an industrial robot is designated generally at numeral 4. The robot 4 includes a main body 41 mounted on the upper surface of the machine tool 1 and movable in the direction of the spindle thereof (i.e., along the X-axis) by means of an air cylinder (not shown), an arm 42 pivoted on the main body 41 for swinging motion, a double hand 43, a wrist 44, and an air cylinder 45 pivoted on the main body 41 for swinging motion. The double hand 44 comprises a first gripper 43a and a second gripper 43b arranged one above the other and rotable in unison by means of a wrist rotating mechanism to be described later. The grippers 43a, 43b have respective fingers 43c, 43d that are openable and closable independently of each other.

The wrist 44 is affixed to a mounting bracket, not shown in FIG. 1, attached to the end of the arm 42.

Figure 3:
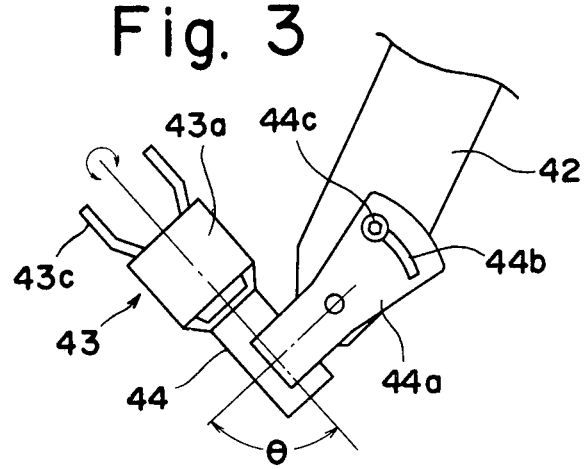
FIG. 3 is a view showing the connections along the arm, wrist and double hand of the present invention.

FIG. 3 is a simplified view of the wrist and surrounding parts, and FIG. 4 a more detailed view of the wrist. In FIG. 3, numeral 42 denotes the arm, 43 the double hand, and 44 the wrist. Numeral 44a designates the mounting bracket. As shown, the mounting bracket 44a is provided with an arcuate guide slot 44b which allows the angle θ defined by the arm 42 and wrist 44 to be adjusted to an angle of a predetermined magnitude. Specifically, loosening a nut 44c enables the angle θ to be set, and retightening the nut 44c maintains the angle at the set value. It should be noted that the angle θ is adjusted in such a manner that the gripping faces of the grippers 43a, 43b lie parallel to the workpiece feeder surface when picking up an unmachined workpiece from the feeder.

Figure 4A:
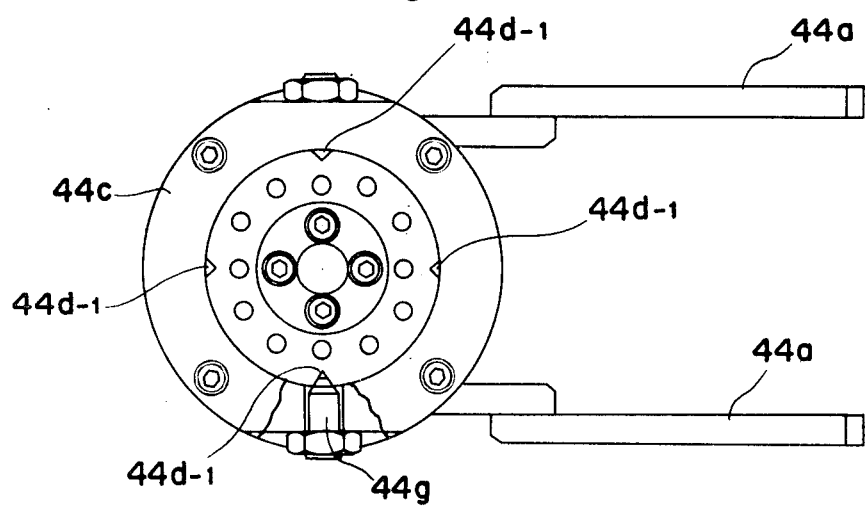
FIGS. 4A and 4B are transverse and longitudinal views, respectively, showing the wrist of FIG. 3 in greater detail.
Figure 4B:
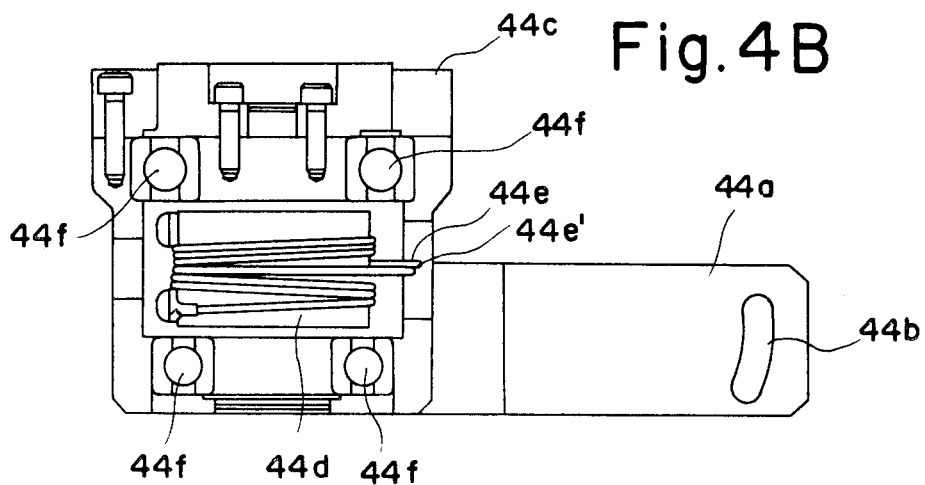

FIGS. 4A and 4B are transverse and longitudinal sectional views, respectively, showing the wrist 44 in detail. As shown, the wrist 44 includes a substantially cylindrical body 44c, a rotary shaft 44d accommodated within the body 44c for rotatable motion, wires 44e, 44e' wound on the rotary shaft 44d, bearings 44f, and four click-stop mechanisms 44g, only one of which is shown, for assuring that the rotary shaft 44d will be retained at whichever of four positions 0°, ±90°, 180° is selected. The wire 44e has one end thereof fastened to the rotary shaft 44d by means of a screw, is wound around the rotary shaft several times, and has its other end affixed to a movable air cylinder, described below, via the pulley of a rotating mechanism within the arm, as will be described later. Likewise, wire 44e' has one end thereof fastened to the rotary shaft 44d by a screw, is wound around the rotary shaft, and has its other end fastened to the air cylinder by a screw. Accordingly, when the air cylinder (not shown in FIG. 4, but shown in FIG. 7) is moved to pull the wire 44e to the right or left in FIG. 4B, the rotary shaft 44d will be rotated in either the clockwise or counter-clockwise direction, thereby rotating the double hand 43, depicted in FIGS. 1 and 3, which is secured to the rotary shaft 44d to form a unitary body therewith. The click-stop mechanism 44g prevents oscillation of the wrist 44 and retains the wrist at any of the 0°, ±90° and 180° positions. More specifically, a fluctuation in load torque subjects the wires 44e, 44e' to elastic deformation, thereby oscillating the wrist 44. To prevent this oscillation, the rotary shaft 44d is formed to include four V-shaped positioning notches 44d-1, one notch being disposed at each of the four circumferential positions 0°, ±90°, 180° of the rotary shaft. In addition, and as shown in FIGS. 5 and 6, the click-stop mechanisms 44g are provided on the cylindrical body 44c and spaced apart by an angle of 90 degrees to mate with the notches 44d-1. This will be better understood with reference to FIG. 6.

In FIG. 6, which is a sectional view of a click stop mechanism 44g, numeral 44g-1 denotes a hollow lock nut that fits into a threaded portion formed within the cylindrical body 44c. Numeral 44g-2 denotes a ball, and 44g-3 a spring, received within the hollow portion of the lock nut 44g-1, for urging the ball 44g-2 toward the center of the rotary shaft 44d. Thus the ball 44g-2 is in pressured contact with the circumferential surface 44d-2 of the rotary shaft 44d while the shaft is rotating. When the rotary shaft 44d is stopped at the positions 0°, ±90°, 180°, however, the ball 44g-2 is forced into one of the V-shaped notches 44d-1 by the pressing force of the spring 44g-3, thereby holding the rotary shaft 44d against oscillation.

Referring again to FIG. 1, the air cylinder 45 functions to swing the arm 42 and, to this end, incorporates a piston rod having one end thereof pivotally secured to the arm. Though not illustrated, pipes for introducing air into the air cylinder 45 are provided at the right and left ends thereof. When air is introduced from the pipe at the right end of the cylinder, the piston rod is extended and swings the arm 42 in the direction of the arrow A. When air is introduced from the pipe at the left end of the cylinder, the piston rod is retracted and swings the arm 42 in the direction of arrow B.

To establish the conditions for loading and unloading workpieces in reliable fashion, the angle through which the arm 42 is to swing and the distance the robot body 41 is to travel longitudinally of the spindle, are set by means such as limit switches or stoppers, taking into account the location of the chuck 1a and the position of the pallet 2a when it is raised by the lifting member 2b.

Figure 7:
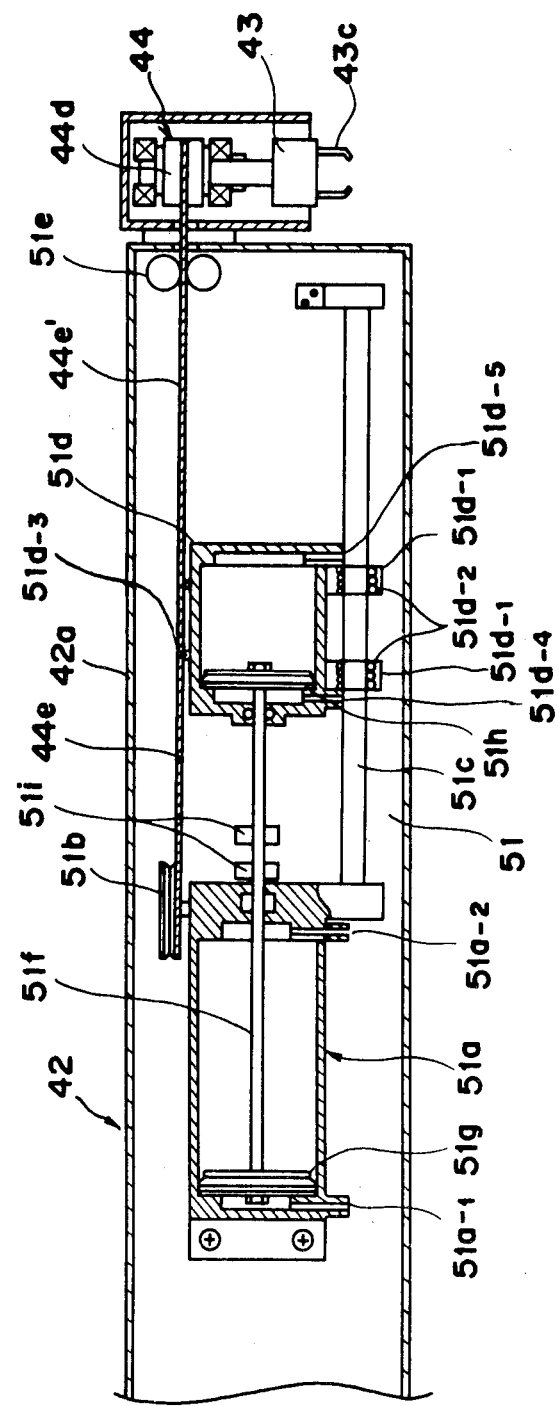
FIG. 7 is a view showing the rotating mechanism of the wrist.
Figure 8:
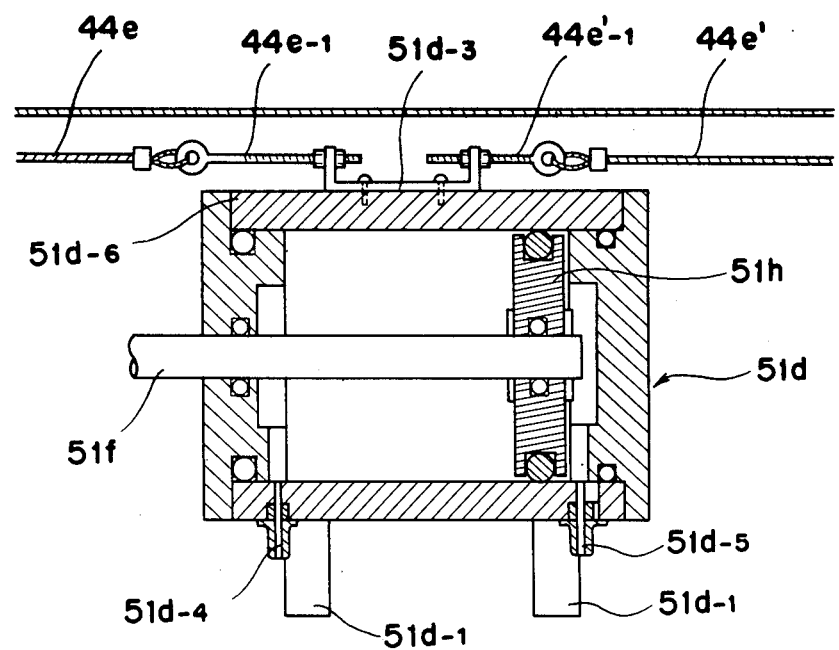
FIG. 8 is a sectional view showing a second air cylinder.

The wrist rotating mechanism is shown in FIG. 7, while FIG. 8 shows the connections among the wires and air cylinders. A wrist rotating mechanism 51, comprising such members as a first air cylinder 51a, a second air cylinder 51d and a pulley 51b, is assembled within the arm 42, having a hollow, elongate form. The arm 42 has a frame 42a to which the first air cylinder 51a is fixedly secured. The first air cylinder 51a has a piston rod 51f and is adapted to move the piston rod over a stroke equivalent to 180 degrees of wrist revolution. Air-introducing pipes 51a-1, 51a-2 are connected to the air cylinder 51a at the respective ends thereof. The pulley 51b is mounted on the first air cylinder 51a. As described above in connection with FIGS. 4 and 5, the wires 44e, 44e' are stretched between the second air cylinder 51d and the rotary shaft 44d of the wrist 44. By pulling these wires to the left or to the right in FIG. 7, the rotary shaft 44d can be rotated in the forward or reverse direction. Formed integral with the first air cylinder 51a is a guide bar 51c along which the second air cylinder 51d is adapted to move. The second air cylinder 51d, shown in greater detail in FIG. 8, has leg members 51d-1, bearings 51d-2 (FIG. 7) incorporated in the leg members, a fitting 51d-3 to which the wires 44e, 44e' are affixed, the fitting 51d-3 being fixedly secured to the frame 51d-6 of the second air cylinder 51d by means of screws, and air-introducing pipes 51d-4, 51d-5 formed in the respective ends thereof. The second air cylinder 51d is fitted on the guide bar 51c so as to be freely movable therealong via the intermediary of the bearings 51d-2, intermediary thereof. The wires 44e, 44e', fastened at one end to the rotary shaft 44d of the wrist 44 by screws as mentioned above, have respective screws 44e-1, 44e'-1 affixed to their other ends. These screws are passed through holes formed in the fitting 51d-3 and then are secured to the fitting by tightening nuts from both sides thereof. The wires are thus affixed to the second air cylinder 51d. In FIG. 7, numeral 51e denotes a pair of rollers which are supported on the arm 42. Although the length of the wires from the rotary shaft 44d of the wrist to the fitting 51d-3 changes when the angle θ (FIG. 3) defined by arm 42 and wrist 44 is adjusted, this change in length can be adjusted for by turning the screws 44e-1, 44e-1' in the proper direction.

The piston rod 51f is shared by both the first and second air cylinders 51a, 51d. A piston 51g is affixed to the end of the piston rod 51f located in the first air cylinder 51a, and a piston 51h is affixed to the end of the piston rod located in the second air cylinder 51d. Thus, two air chambers are defined in each air cylinder, for a total of four air chambers. Numeral 51i denotes a stopper the fine adjustment of which regulates the length of the stroke of piston 51g.

Reference will now be made to FIGS. 7 and 9 to describe the four-point positioning of the wrist or grippers. The wrist 44 is positioned at one of the four points 0°, ±90°, 180° depending upon which combination of the four air chambers defined in the first and second air cylinders 51a, 51d is pressurized. It should be noted that the wrist 44 is located at the 90° position when the piston rod 51f and second cylinder 51d have the positional attitudes shown in FIG. 7.

In FIG. 7, when air is introduced into the cylinders from the inlets 51a-2, 51d-4, the second cylinder 51d is moved to the left to assume the attitude shown in FIG. 9A. As the second cylinder 51d moves, so do the wires 44e, 44e', positioning the rotary shaft at the 0° position. On the other hand, when air is fed solely into the first piston cylinder 51a from the inlet 51a-1 in FIG. 7, the piston rod 51f is driven to the right over the length of its stroke, corresponding to 180 degrees of rotation. In the course of travelling this distance, the piston 51h comes into abutting contact with the right wall of the second air cylinder 51d just as the first half of the stroke, equivalent to 90 degrees of rotation, is reached. Thereafter, the second air cylinder 51d is moved to the right a distance corresponding to 90 degrees of rotation by the second half of the piston rod stroke. The total distance covered by the second cylinder 51d therefore is equivalent to 90 degrees, so that the wrist 44 is now located at the 180° position. This is represented by FIG. 9B.

Next, if air is introduced into the air cylinders 51a, 51d from the inlets 51a-1, 51d-5 starting from the condition shown in FIG. 9B, which corresponds to the 180° position, then the second air cylinder 51d will be driven further to the right over a distance equivalent to 90 degrees of rotation, as shown in FIG. 9C, pulling the wires to rotate the shaft 44 to the 270° (−90°) position. FIG. 9D shows the situation when the wrist is positioned at 90 degrees, and corresponds to the view in FIG. 7.

Reference will now be made to FIGS. 10 and 11 to describe how a workpiece 3 is moved between the table 2 and machine tool 1, specifically how the workpiece is loaded and unloaded. We shall take the longitudinal direction of the machine tool spindle as the X-axis, and the direction in which the arm 42 swings as the A-axis.

Also, before the robot can begin performing services, various adjustments and settings must be made. The first of these is to swing the arm 42 in the negative direction along the −A axis, that is, counter-clockwise in FIG. 10, followed by adjusting the angle of the wrist 44 relative to the arm in such a manner that the gripping center of gripper 43a, held in front of the chuck 1a, coincides with the chuck center. This is the condition shown by the solid lines in FIG. 10. Following this adjustment, the nut 44c (FIG. 3) is tightened to fix the angle of the wrist relative to the arm. Concurrently, a stopper (not shown) for the −A axis is adjusted to limit the swinging motion of the arm 42 in the negative (counter-clockwise) direction along said axis. In addition, a positioning plate, also not shown, is adjusted to set the limit of travel of the arm 42 in the negative direction along the −X axis. Next, the arm 42 is moved along the X axis in the positive direction and swung along the A axis in the positive (clockwise) direction so that the gripping faces of the gripper 43a lie parallel with the surface of the workpiece feeder pallet 2a. This condition is indicated by the phantom lines in FIG. 10. Thereafter, the remaining stopper (not shown) is adjusted to limit the swinging motion of the arm 42 in the positive direction along the A axis, and a positioning plate (not shown) is adjusted to limit the travel of the arm 42 in the positive direction along the X axis.

The above completes the limit and other settings so that the robot is ready to service the machine tool in a manner which will now be described. We will assume that gripper 43b is gripping an as yet unmachined workpiece 3' at the start of the sequence to be set forth, and that gripper 43a is vacant.

In the following sequence, intended to exemplify the operation of the robot, workpieces are loaded and unloaded, relative to the chuck 1a, without palletizing.

(1) Door 1b, shown in FIG. 1, is opened in response to a signal generated by a control device 9 (FIG. 10) provided in back of the machine tool 1.

(2) Arm 42 is swung in the negative direction along the −A axis in response to an arm actuating signal.

(3) Arm 42 is moved in the negative direction along the −X axis in response to an arm moving signal, after which the fingers 43c of gripper 43a are closed to grip a machined workpiece 3 being held by the chuck 1a.

(4) The chuck 1a is opened to release the workpiece 3.

(5) Arm 42 is moved a short distance in the positive direction along the X axis in response to an arm moving signal.

(6) The grippers 43a, 43b are rotated 180 degrees relative to the wrist 44, after which arm 42 is moved in the negative direction along the −X axis in response to an arm moving signal to carry the unmachined workpiece 3', held by gripper 43b, to the chuck 1a.

(7) Chuck 1a is closed to grasp the unmachined workpiece 3', after which the fingers 43 are opened to release the unmachined workpiece 3'.

(8) Arm 42 is moved in the positive direction along the X axis in response to an arm moving signal, after which the arm is swung in the positive direction along the A axis in response to an arm actuating signal.

(9) The door 1b of the machine tool 1 is closed.

(10) The grippers 43a, 43b are rotated 90 degrees relative to the wrist 44 to position gripper 43b below gripper 43a.

(11) A workpiece feeder pallet 2a carrying an unmachined workpiece 3' is raised, as shown in FIG. 11A, to lift the unmachined workpiece 3' to the gripper 43b.

(12) The fingers 43d are closed to grip the unmachined workpiece 3', whereupon the pallet 2a is lowered part of the way, as shown in FIG. 11B.

(13) Grippers 43a, 43b are rotated 180 degrees relative to the wrist 44 to position gripper 43a below gripper 43b. This is indicated in FIG. 11C.

(14) Pallet 2a is raised, as depicted in FIG. 11D.

(15) Fingers 43c of gripper 43a are opened to place the workpiece 3 on pallet 2a, as shown in FIG. 11E.

(16) Pallet 2a is lowered to the table 2 (FIG. 1) and grippers 43a, 43b are rotated 90 degrees relative to the wrist 44 to execute the next cycle.

In accordance with the present invention as described and illustrated hereinabove, two air cylinders, one of which is movable, are arranged colinearly and share a single piston rod, whereby two air chambers are defined in each cylinder, for a total of four air chambers. This arrangement makes it possible to position the wrist at four positions by introducing air into suitable combinations of the air chambers. Furthermore, according to the invention, an actuator need not be mounted on the wrist mechanism, and the rotating portion (wrist) and drive member are separated from each other by virtue of the wires. This feature reduces the size and weight of the wrist portion. In addition, fine adjustment of stroke for the four-point positioning is achieved merely by adjusting the position of the stopper associated with the piston rod, enabling position adjustment to be carried out in a very simple manner.

As many different embodiments of the present invention can be made without departing from the spirit and scope thereof, it is to be understood that the invention is not limited to the specific embodiments thereof except as defined in the appended claims.

What we claim is:

1. An industrial robot, comprising:
    an arm rotatable in a plane perpendicular to the longitudinal axis of a spindle of a machine tool;
    wrist means attached for rotation at one end of said arm, said wrist means having a rotary shaft;
    gripper means for gripping objects and being connected to the rotary shaft of said wrist means for being rotated thereby;
    first and second cylinders connected coplanar to said arm, said first cylinder being fixed relative to said arm and said second cylinder being movable longitudinally of said arm;
    a piston rod interconnecting said first and second cylinders, said piston rod having a first piston at one end received in said first cylinder and a second piston at the other end received in said second cylinder, said piston rod being moved longitudinally of said arm by introducing a fluid selectively into said first and second cylinders;
    a pulley affixed to said first cylinder; and
    tension means connected between the rotary shaft of said wrist mechanism and said pulley, wherein
    said second cylinder is connected to said tension means, and
    said tension means is pulled by driving said second cylinder, thereby rotating said rotary shaft.

2. An industrial robot according to claim 1, wherein said tension means comprises first and second tension members, said first tension member having an end wound around said rotary shaft and affixed thereto and another end connected to said second cylinder via said pulley, said second tension member having an end affixed to said rotary shaft and another end connected to said second cylinder.

3. An industrial robot according to claim 1 or claim 2, wherein said fluid is air and said first and second cylinders are air cylinders.

4. An industrial robot according to claim 3, wherein said first and second air cylinders each have two air-introducing pipes, air being selectively introduced into said first and second air cylinders from said air-introducing pipes to drive said second air cylinder longitudinally of said arm in order to rotate said rotary shaft, said rotary shaft being stopped at 0°, ±90° and 180° positions by introducing predetermined combinations of air into said air-introducing pipes.

5. An industrial robot according to claim 4, wherein said rotary shaft has an outer circumferential surface provided with four notches spaced apart by 90 degrees and four stopping means spaced apart by 90 degrees being disposed around said rotary shaft for engaging said notches.

6. An industrial robot according to claim 1 or claim 2, wherein said gripping means has two independently operable hands arranged one above the other.

7. The industrial robot according to claim 2, wherein the first and second tension members are each a wire.

8. The industrial robot according to claim 2, wherein the first and second tension members are each a belt.

* * * * *

UNITED STATES PATENT AND TRADEMARK OFFICE
CERTIFICATE OF CORRECTION

PATENT NO. : 4,462,748

DATED : 7/31/84

INVENTOR(S) : Inaba et al.

It is certified that error appears in the above-identified patent and that said Letters Patent is hereby corrected as shown below:

Col. 1
Line 17, "per se" s/b --per se--.
Line 40, "Thus" s/b --Thus,--.

Col. 4
Line 50, delete "the intermediary of".

Signed and Sealed this

Eighteenth Day of December 1984

[SEAL]

Attest:

GERALD J. MOSSINGHOFF

Attesting Officer

Commissioner of Patents and Trademarks